United States Patent [19]

Machida et al.

[11] Patent Number: 4,623,939
[45] Date of Patent: Nov. 18, 1986

[54] ROTATION CONTROL APPARATUS FOR A MOTOR

[75] Inventors: Toyotaka Machida, Kashiwa; Ken Enami, Fujieda, both of Japan

[73] Assignee: Victor Company of Japan, Ltd., Yokohama, Japan

[21] Appl. No.: 673,659

[22] Filed: Nov. 21, 1984

[30] Foreign Application Priority Data

Nov. 22, 1983 [JP] Japan ................. 58-220444

[51] Int. Cl.⁴ ..................... H04N 5/93; G11B 19/24
[52] U.S. Cl. ..................... 358/342; 360/73; 369/239; 369/50
[58] Field of Search ................. 358/321-322, 358/338, 342; 369/47, 50, 239, 241; 360/73

[56] References Cited

U.S. PATENT DOCUMENTS

| | | | |
|---|---|---|---|
| 3,174,090 | 3/1965 | Hall | 360/73 X |
| 3,503,058 | 3/1970 | Ault et al. | 360/73 |
| 3,526,726 | 9/1970 | Corbett et al. | 360/73 X |
| 3,873,764 | 3/1975 | Boltz, Jr. | 358/338 |
| 4,003,090 | 1/1977 | Beck | 360/73 X |
| 4,123,779 | 10/1978 | Goldschmidt | 369/241 X |
| 4,338,683 | 7/1982 | Furukawa et al. | 369/50 |
| 4,338,713 | 6/1983 | Tatsuguchi | 360/73 X |
| 4,423,498 | 12/1983 | Kimura et al. | 369/47 |
| 4,496,998 | 1/1985 | Takimoto | 360/73 X |
| 4,500,982 | 2/1985 | Yoshida | 369/50 |
| 4,532,561 | 7/1985 | Kimura et al. | 360/73 |
| 4,539,667 | 9/1985 | Fujiie | 369/50 |
| 4,542,423 | 9/1985 | Kotake et al. | 360/73 |

Primary Examiner—Raymond F. Cardillo
Assistant Examiner—Wayne R. Young
Attorney, Agent, or Firm—Michael N. Meller

[57] ABSTRACT

A rotation control apparatus for a motor comprises a motor for rotating or moving a recording medium, a circuit for generating first and second reference signals, a circuit for passing a signal which is obtained by comparing phases of the first reference signal and a synchronizing signal through a filter circuit thereof so as to produce a first error signal therefrom, a circuit for producing a second error signal which is obtained by comparing phases of the second reference signal and the rotation detection signal, and a control circuit for controlling first and second switching circuits. The control circuit supplies a specific signal having a level dependent on the level of the second error signal to a capacitor of the filter circuit through the second switching circuit and selectively passes the second error signal through the first switching circuit when the motor rotates at a rotational speed which is not near a steady state rotational speed. The control circuit blocks the supply of the specific signal to the capacitor by the first switching circuit and selectively passes the first error signal through the first switching circuit when the motor rotates at a rotational speed which is approximately equal to the steady state rotational speed.

7 Claims, 5 Drawing Figures

ROTATION CONTROL APPARATUS FOR A MOTOR

BACKGROUND OF THE INVENTION

The present invention generally relates to rotation control apparatuses for motors, and more particularly to a rotation control apparatus for controlling the rotation of a motor for rotating or moving a recording medium by use of a rotation detection signal having a period dependent on the rotational speed of the motor when the motor starts to rotate and by use of a synchronizing signal reproduced from the recording medium when the motor reaches a steady state rotational speed.

The rotation of a motor for rotating or moving a recording medium such as a video disc which is prerecorded with a video signal, is generally controlled based on a phase error voltage $V_1$ which is obtained by comparing the phase of a first reference signal produced from an oscillator with the phase of a horizontal synchronizing signal within the video signal which is reproduced from the recording medium. However, a synchronizing signal separating circuit which is used to separate the reproduced horizontal synchronizing signal from the reproduced video signal, can only separate the reproduced horizontal synchronizing signal when the reproduced horizontal synchronizing signal within the reproduced video signal has a frequency which is within a predetermined frequency range having a regular frequency $f_H$ of the horizontal synchronizing signal as the center of the predetermined frequency range. Hence, during a time period from the start of the motor until the frequency of the reproduced horizontal synchronizing signal reaches a frequency within the predetermined frequency range, a reproduced horizontal synchronizing signal cannot be obtained from the synchronizing signal separating circuit.

Accordingly, during the above time period, the rotation of the motor is controlled based on a phase error voltage $V_2$ which is obtained by comparing the phase of an output signal of a frequency generator which generates a signal having a frequency proportional to the rotational speed of the motor with the phase of a second reference signal which is obtained by frequency-dividing the first reference signal in a frequency divider. The phase error voltage $V_2$ is applied to the motor through a phase compensating circuit and a motor driving circuit, and controls the motor so that the rotational speed of the motor swiftly increases to a rotational speed which is near the steady state rotational speed. When the rotational speed of the motor reaches a rotational speed near the steady state rotational speed and the reproduced horizontal synchronizing signal is obtained from the synchronizing signal separating circuit, the phase error voltage $V_1$ is obtained by attenuating a high frequency component of a phase error voltage which is obtained by comparing the phase of the first reference signal and the phase of the reproduced horizontal synchronizing signal in a filter circuit, and this phase error voltage $V_1$ is supplied to a switching circuit. The switching circuit switches the output phase error voltage from the phase error voltage $V_2$ to the phase error voltage $V_1$, responsive to an output signal of a discriminating circuit which discriminates that the rotational speed of the motor has reached a rotational speed near the steady state rotational speed and to an output signal of a detector which detects that the recording medium is in a playable state. The output phase error voltage of the switching circuit is applied to the motor through the phase compensating circuit and the motor driving circuit. As a result, the rotational speed of the motor is controlled so that the phase of the first reference signal coincides with the phase of the reproduced horizontal synchronizing signal.

When the control voltage for controlling the rotational speed of the motor is switched over from the phase error voltage $V_2$ to the phase error voltage $V_1$ in the conventional rotation control apparatus, measures must be taken so that the stability of the control operation of the rotation control apparatus is satisfactory upon taking place of a lock-in (pull-in) in which the reproduced horizontal synchronizing signal is locked with the first reference signal. The filter circuit described before comprises a first resistor which is coupled between an input terminal and an output terminal, and a second resistor and a capacitor coupled in series between the first resistor and the output terminal. The stability with which the rotation control apparatus carries out the control operation, is greatly affected by a terminal voltage $V_{c-c}$ of the capacitor at a time before the lock-in takes place.

In a case where there is a great difference between the terminal voltage $V_{c-c}$ described before and a terminal voltage $V_{c-s}$ of the capacitor after the lock-in takes place and the rotation of the motor has reached the steady state rotational speed, the control system exceeds a linear operating range due to the charging and discharging of the capacitor that takes place when the switching circuit is switched. As a result, the stability of the control operation carried out by the rotation control apparatus becomes poor, and in an extreme case, the rotation control apparatus can no longer carry out the control operation. The terminal voltage $V_{c-s}$ changes when the load of the motor changes due to a change in the ambient temperature or the like and when a drift occurs in the output signal of the motor driving circuit. Therefore, even in a case where the terminal voltage $V_{c-c}$ is initially set to an ideal voltage, there is a problem in that the lock-in may become unstable due to causes such as a change in the operating condition of the motor.

SUMMARY OF THE INVENTION

Accordingly, it is a general object of the present invention to provide a novel and useful motor control apparatus for a motor, in which the problems described heretofore are eliminated.

Another and more specific object of the present invention is to provide a motor control apparatus for a motor, in which a terminal voltage of a capacitor within a filter circuit which supplies a first error signal to a motor when the motor is rotating at a steady state rotational speed, where the first error signal is dependent on a difference between a reproduced synchronizing signal and a first reference signal, is variably controlled responsive to the level of a second error signal when the motor is not rotating near the steady state rotational speed, where the second error signal is dependent on a difference between a second reference signal and a rotation detection signal which has a period dependent on the rotational speed of the motor. According to the rotation control apparatus of the present invention, it is possible to set the first and second error signals to approximately the same value when switching the error signal which is applied to the motor as a rotation control signal, from the second error signal to the first error signal. Hence, the control operation of the rotation control apparatus according to the present invention is essentially unaffected by causes such as a change in the load of the motor and a drift introduced in the output signal of the motor driving circuit, even when the switching of the first and second error signals takes place, and the lock-in of the first error signal with the second error signal is achieved with a satisfactory stability.

A further object of the present invention is to provide a rotation control apparatus for a motor, in which a blocking of the supply of the second error signal or a signal dependent on the level of the second error signal to the capacitor, is delayed by a predetermined time which is equal to or greater than a time it takes for the motor to essentially reach the steady state rotational speed from a time when it is detected that the rotational speed of the motor has reached the speed near the steady state rotational speed, so that the first error signal will stably lock-in with the second error signal.

Another object of the present invention is to provide a rotation control apparatus for a motor, in which the second error signal or the signal dependent on the level of the second error signal, is supplied to the capacitor immediately after a time when it is detected that the rotational speed of the motor has reached a non-steady state rotational speed. According to the rotation control apparatus according to the present invention, it is possible to design a system which has a high safety factor and in which the rotational speed of the motor will not increase to such an extremely high rotational speed that the rotational speed of the motor is uncontrollable. In addition, the circuit construction of the rotation control apparatus according to the present invention is simple.

Other objects and further objects of the present invention will be apparent from the following detailed description when read in conjunction with the accompanying drawings.

DETAILED DESCRIPTION

Figure 1:
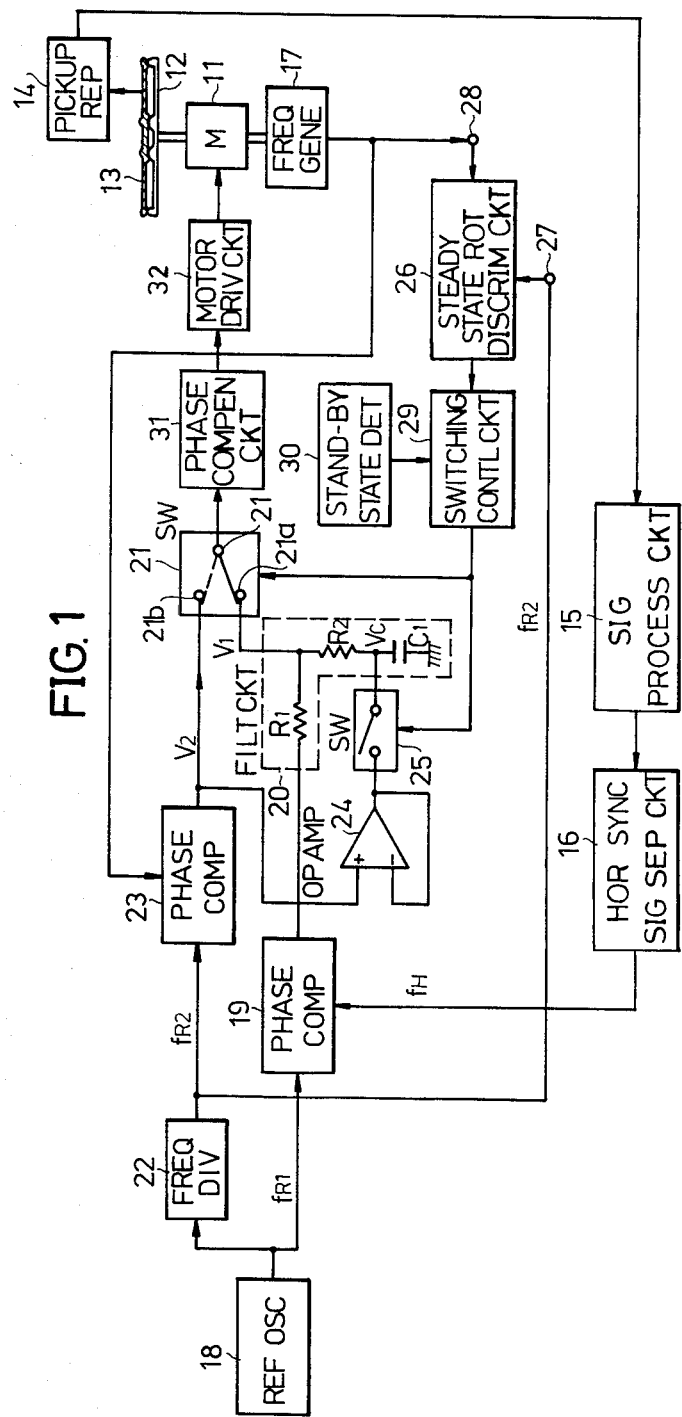
FIG. 1 is a systematic circuit diagram showing an embodiment of a rotation control apparatus according to the present invention.

In FIG. 1, a motor 11 rotates a turntable 12, and the rotation of this motor 11 is to be controlled. A video disc 13 is placed on the turntable 12, and a pre-recorded video signal is reproduced from the video disc 13 by a pickup reproducer 14. The pickup reproducer 14 reproduces the pre-recorded video signal from the video disc 13, by detecting variations in the electrostatic capacitance formed between the video disc 13 and an electrode of a reproducing stylus, or by detecting variations in the intensity of light reflected by or transmitted through the video disc 13. The reproduced video signal is supplied to a signal processing circuit 15 wherein the signal format of the reproduced video signal is returned to the original signal format. An output reproduced video signal of the signal processing circuit 15 is supplied to a horizontal synchronizing signal separating circuit 16 wherein a reproduced horizontal synchronizing signal is separated.

The horizontal synchronizing signal separating circuit 16 separates the reproduced horizontal synchronizing signal from the reproduced video signal, only when the reproduced horizontal synchronizing signal has a frequency which is within a predetermined frequency range having a regular frequency $f_H$ of the horizontal synchronizing signal as the center of the predetermined frequency range. Accordingly, a reproduced horizontal synchronizing signal is not obtained from the horizontal synchronizing signal separating circuit 16 during a time period from a time immediately after the motor 11 is started up to a time when the frequency of the reproduced horizontal synchronizing signal enters within the predetermined frequency range. A known frequency generator 17 which is connected to a rotary shaft of the motor 11, constantly generates a rotation detection signal having a period which is dependent on the rotational speed of the motor 11.

On the other hand, a first reference signal $f_{R1}$ which has a frequency equal to a horizontal scanning frequency $f_H$ and is produced from a reference oscillator 18, is supplied to a phase comparator 19. The phase comparator 19 compares the phase of the first reference signal $f_{R1}$ with the phase of the output reproduced horizontal synchronizing signal of the horizontal synchronizing signal separating circuit 16, and produces a phase error voltage. The output phase error voltage of the phase comparator 19 is passed through a filter circuit 20 which attenuates a high frequency component thereof, and an output phase error voltage $V_1$ of the filter 20 is applied to a terminal 21a of a switching circuit 21. The filter circuit 20 comprises resistors $R_1$ and $R_2$ and a capacitor $C_1$. One end of the resistor $R_2$ is connected to one end of the resistor $R_1$ and to a terminal 21a of the switching circuit 21, and the other end of the resistor $R_2$ is grounded through the capacitor $C_1$. The first reference signal $f_{R1}$ is also supplied to a frequency divider 22 wherein the first reference signal $f_{R1}$ is frequency-divided into a second reference signal $f_{R2}$ having a predetermined frequency. The second reference signal $f_{R2}$ is supplied to a phase comparator 23 wherein the phase of the second reference signal $f_{R2}$ is compared with the phase of the output rotation detection signal of the frequency generator 17. The frequency of the second reference signal $f_{R2}$ is selected so that the frequency of the second reference signal $f_{R2}$ is equal to the frequency of the output rotation detection signal of the frequency generator 17 when the motor 11 is rotating at a regular rotational speed.

An output phase error voltage $V_2$ of the phase comparator 23 is applied to the terminal 21b of the switching circuit 21. In addition, the phase error voltage $V_2$ is also supplied to an operational amplifier 24 which constitutes a voltage follower, and is subjected to an impedance conversion and non-inverted amplification. An output signal of the operational amplifier 24 is supplied to a switching circuit 25. An output terminal of the switching circuit 25 is connected to a connection point between the resistor $R_2$ and the capacitor $C_1$ within the filter circuit 20. A steady state rotation discriminating circuit 26 discriminates whether the motor 11 is rotating at a steady state rotational speed or at a rotational speed which is near the steady state rotational speed. The steady state rotation discriminating circuit 26 is supplied with the second reference signal $f_{R2}$ which is applied to an input terminal 27, and with the output rotation detection signal of the frequency generator 17 which is applied to an input terminal 28.

Figure 2:
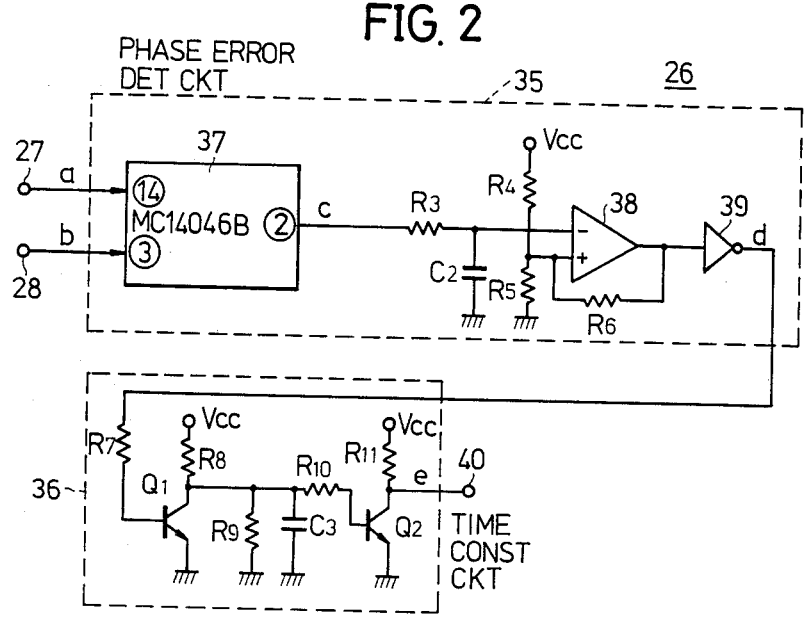
FIG. 2 is a circuit diagram showing an embodiment of a steady state rotation discriminating circuit within the circuit system shown in FIG. 1.
Figure 3:
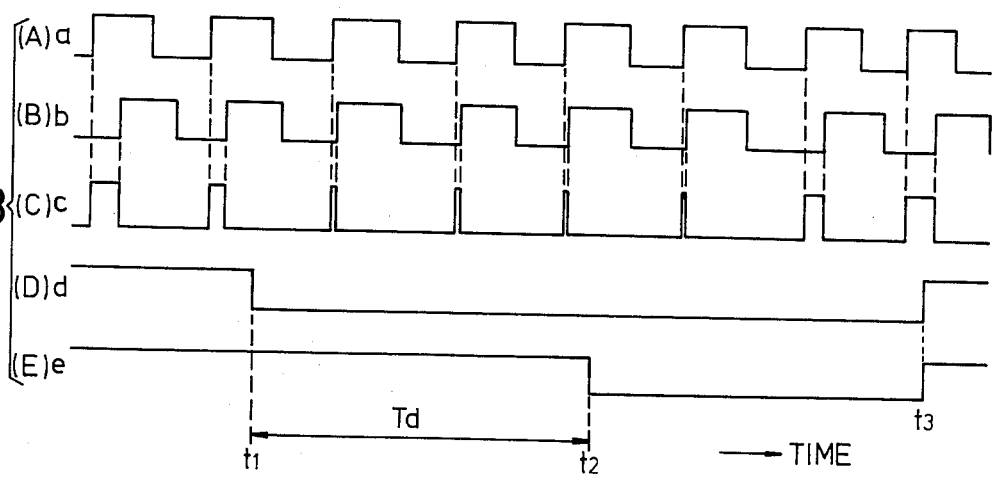
FIGS. 3(A) through 3(E) show signal waveforms for explaining the operation of the circuit shown in FIG. 2.

As shown in FIG. 2, the steady state rotation discriminating circuit 26 comprises a phase error detecting circuit 35 and a time constant circuit 36. In FIG. 2, the second reference signal $f_{R2}$ applied to the input terminal 27, is supplied to a No. 14 pin of a phase locked loop integrated circuit (IC) 37. The output rotation detection signal of the frequency generator 17 which is applied to the input terminal 28, is supplied to a No. 3 pin of the IC 37. For example, in a case where a chip M 14046B manufactured by Motorola, U.S.A. is used for the IC 37, a pulse signal having a pulse width dependent on the phase error between the signals applied to the No. 14 and No. 3 pins of the IC 37, is produced from a No. 2 pin. Accordingly, when it is assumed that the second reference signal $f_{R2}$ is a pulse train a having a predetermined repetition frequency as shown in FIG. 3(A) and that the output rotation detection signal of the frequency generator 17 is a pulse train b shown in FIG. 3(B), the signal produced from the No. 2 pin of the IC 37 is a pulse train c shown in FIG. 3(C). The pulse train c is converted into a D.C. voltage in an integrating circuit which is made up of a resistor $R_3$ and a capacitor $C_3$, and is supplied to an inverting input terminal of an operational amplifier 38.

A power source voltage Vcc is divided by a voltage divider constituted by resistors $R_4$ and $R_5$, and is supplied to a non-inverting input terminal of the operational amplifier 38. An output signal of the operational amplifier 38 is fed back to the non-inverting input terminal of the operational amplifier 38 through a resistor $R_6$. In other words, a Schmitt trigger circuit is constituted by the resistors $R_4$ through $R_6$ and the operational amplifier 38, and a signal d shown in FIG. 3(D) is obtained when the output signal of the operational amplifier 38 is passed through an inverter 39. The signal d assumes a low level when the phase error between the pulse trains a and b is less than or equal to 4H, that is, when the rotational speed of the motor 11 is near the steady state rotational speed, where H represents one horizontal scanning period. On the other hand, the signal d assumes a high level when the phase error between the pulse trains a and b is greater than or equal to 17H, that is, when the motor 11 is rotating at such a non-steady state rotational speed that a reproduced horizontal synchronizing signal cannot be separated in the horizontal synchronizing signal separating circuit 16. A circuit reaching the inverter 39 from the IC 37, constitutes the phase error detecting circuit 35.

The signal d is supplied to a time constant circuit 36. The time constant circuit 36 comprises resistors $R_7$ through $R_{11}$, NPN type transistors $Q_1$ and $Q_2$, and a capacitor $C_3$. The signal d supplied to a base of the transistor $Q_1$ through the resistor $R_7$, turns the transistor $Q_1$ ON during a high level period of the signal d, and turns the transistor $Q_1$ OFF during a low level period of the signal d. Hence, the transistor $Q_1$ is turned OFF when the level of the signal d changes from a high level to a low level at a time $t_1$, that is, when it is detected at the time $t_1$ that the rotational speed of the motor 11 has reached a rotational speed near the steady state rotational speed. Thus, the power source voltage Vcc is divided by the resistors $R_8$ and $R_9$ and is applied to the capacitor $C_3$ so as to start charging the capacitor $C_3$. The terminal voltage of the capacitor $C_3$ gradually increases depending on a charging time constant which is determined by the resistance of the resistor $R_8$, the capacitance of the capacitor $C_3$, and the value of the power source voltage Vcc.

The terminal voltage of the capacitor $C_3$ is supplied to a base of the transistor $Q_2$ through the resistor $R_{10}$. Thus, as the charging of the capacitor $C_3$ progresses and the terminal voltage of the capacitor $C_3$ reaches a predetermined voltage at a time $t_2$, the transistor $Q_2$ is turned ON from the OFF state. As a result, the signal level at a connection point between a collector of the transistor $Q_2$ and the resistor $R_{11}$ is high before the time $t_2$, but becomes low at the time $t_2$. In other words, a signal voltage e produced through an output terminal 40 from the collector of the transistor $Q_2$, assumes a low level at the time $t_2$ which is a predetermined delay time $T_d$ after the time $t_1$ as shown in FIG. 3(E). The predetermined delay time $T_d$ is determined by the charging time constant of the capacitor $C_3$, and is selected to a time which is greater than or equal to a time it takes for the rotational speed of the motor 11 to essentially reach the steady state rotational speed from a rotational speed which is near the steady state rotational speed. For example, the predetermined delay time $T_d$ is selected to a time of 35 msec to 40 msec.

In a case where the resistances of the resistors $R_8$, $R_9$ and $R_{10}$ are equal to 270 k$\Omega$, 56 k$\Omega$, and 0$\Omega$, respectively, the power source voltage Vcc is equal to 12 volts, and the capacitance of the capacitor $C_3$ is equal to 22 $\mu$F., for example, the predetermined delay time $T_d$ is approximately equal to 35 msec.

On the other hand, the transistor $Q_1$ is turned ON when the level of the signal d changes from a low level to a high level at a time $t_3$ as shown in FIG. 3(D), that is, when it is detected at the time $t_3$ that the rotational speed of the motor 11 has reached the non-steady state rotational speed. Accordingly, the capacitor $C_3$ is discharged instantaneously through the transistor $Q_1$ which is turned ON, and for this reason, the transistor $Q_2$ is turned OFF from the ON state at approximately the time $t_3$. Therefore, the signal voltage e produced through the output terminal 40 assumes a high level approximately at the time $t_3$ as shown in FIG. 3(E).

The output signal voltage e of the steady state rotation detecting circuit 26, which is produced through the output terminal 40, is supplied to a switching control circuit 29 shown in FIG. 1. An output signal of a stand-by state detector 30 is supplied to the switching control circuit 29. The stand-by state detecting circuit 29 detects a stand-by state of a reproducing apparatus, that is, a state in which the reproducing apparatus can carry out a reproduction. For example, when the pickup reproducer 14 comprises a reproducing stylus for reproducing the pre-recorded video signal from the video disc 13 as variations in the electrostatic capacitance between the video disc 13 and an electrode of the reproducing stylus, the stand-by state detecting circuit 29 detects that the reproducing apparatus (pickup reproducer 14) is in the stand-by state and produces a stand-by state detection signal when the reproducing stylus is in contact with the video disc.

The switching control circuit 29 passes the output signal votage e of the steady state rotation discriminating circuit 26 unchanged, during a time period in which an output stand-by state detection signal of the stand-by state detector 30 is supplied to the switching control circuit 29. The signal voltage e which is passed through the switching control circuit 29, is applied to the switching circuits 21 and 25 as a switching signal. When the switching signal assumes a high level, the switching circuit 21 is connected to the terminal 21b, and the switching circuit 25 is turned ON, so that the second phase error voltage $V_2$ which is supplied to the capacitor $C_1$ within the filter circuit 20 through the operational amplifier 24. On the other hand, when the switching signal assumes a low level, the switching circuit 21 is connected to the terminal 21a, and the switching circuit 25 is turned OFF, so as to block the supply of the second phase error voltage $V_2$ to the capacitor $C_1$. Because the switching control circuit 29 is designed to produce a high level switching signal when the pickup reproducer 14 is not in the stand-by state, the switching circuit 25 is turned ON independent of the level of the signal e when the pickup reproducer 14 is not in the stand-by state. Consequently, the second phase error voltage $V_2$ is constantly supplied to the capacitor $C_1$ when the pickup reproducer 14 is not in the stand-by state.

Figure 4:
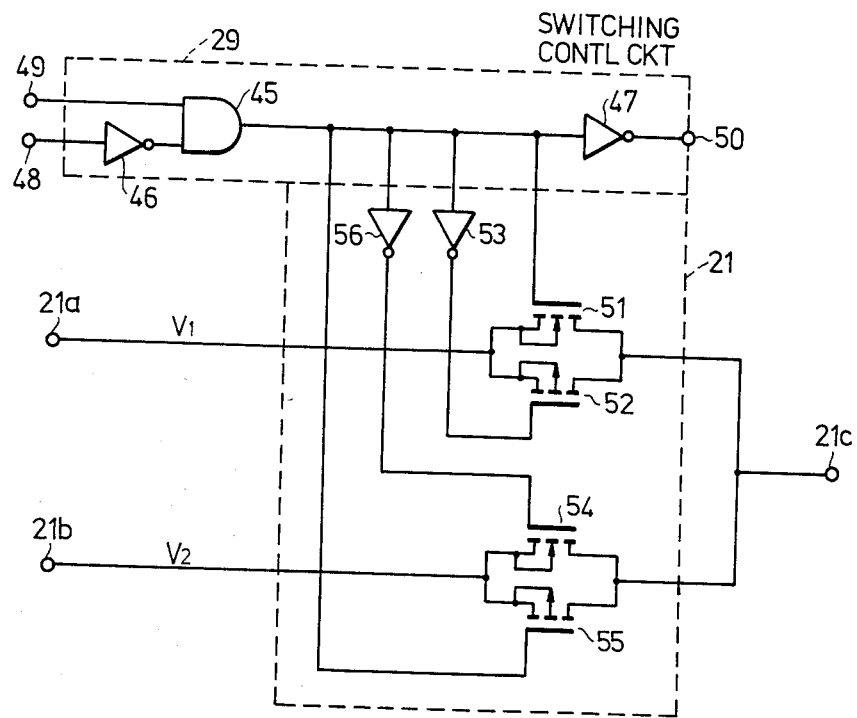
FIG. 4 is a circuit diagram showing an embodiment of a switching circuit and a switch control circuit within the circuit system shown in FIG. 1.

The switching circuit 21 and the switching control circuit 29 have constructions shown in FIG. 4, for example. In FIG. 4, those parts which are the same as those corresponding parts in FIG. 1 are designated by the same reference numerals. The switching control circuit 29 comprises an AND circuit 45 and inverters 46 and 47, and the output signal e of the steady state rotation discriminating circuit 26 is supplied to one input terminal of the AND circuit 45 through an input terminal 48 and the inverter 46. The output signal of the stand-by state detector 30 is supplied to the other input terminal of the AND circuit 45 through an input terminal 49. When it is assumed that the stand-by state detector 30 produces a high level signal when the pickup reproducer 14 is in the stand-by state and produces a low level signal when the pickup reproducer 14 is not in the stand-by state, a high level signal is produced from the AND circuit 45 only when the signal e assumes a low level, that is, only when the steady state rotation is detected.

The output signal of the AND circuit 45 is supplied to the switching circuit 21, and to the inverter 47. An output signal of the inverter 47 is produced through an output terminal 50 and is supplied to the switching circuit 25. The switching circuit 21 comprises N-channel MOSFETs 51 and 54, P-channel MOSFETs 52 and 55, and inverters 53 and 56. The output signal of the AND circuit 45 is supplied directly to gates of the FETs 51 and 55. In addition, the output signal of the AND circuit 45 is supplied to a gate of the FET 52 through the inverter 53, and is also supplied to a gate of the FET 54 through the inverter 56. Sources of the FETs 51 and 52 are commonly connected to the terminal 21a, and sources of the FETs 54 and 55 are commonly connected to the terminal 21b. Drains of the FETs 51, 52, 54, and 55 are commonly connected to a terminal 21c. Accordingly, the FETs 51 and 52 and the inverter 53 constitute a first analog switch, and the FETs 54 and 55 and the inverter 56 constitute a second analog switch.

Therefore, in a case where the pickup reproducer 14 assumes the stand-by state and the motor 11 is rotating at the steady state rotational speed, a high level signal is produced from the AND circuit 45, and the FETs 51 and 52 are turned ON while the FETs 54 and 55 are turned OFF. As a result, the first phase error voltage $V_1$ applied to the terminal 21a, is passed through the FETs 51 and 52 and is produced through the terminal 21c. On the other hand, in other cases, the AND circuit 45 produces a low level signal and the FETs 51 and 52 are turned OFF while the FETs 55 and 56 are turned ON, which means that the phase error voltage $V_2$ applied to the terminal 21b is produced through the terminal 21c.

The output signal of the AND circuit 45 may be supplied to the FETs 52 and 54 through a single inverter. Further, in a case where the switching circuit 25 is constituted by analog switches employing FETs as shown in FIG. 4, the output signal of the inverter 47 and the output signal of the AND circuit 45 are supplied to the switching circuit 25.

Prior to the time $t_1$, the motor 11 is rotating at the non-steady state rotational speed, that is, not rotating at the steady state rotational speed. Consequently, the switching circuit 25 is turned ON, and the terminal voltage $V_c$ of the capacitor $C_1$ assumes the second phase error voltage $V_2$. On the other hand, prior to the time $t_1$, the switching circuit 21 is connected to the terminal 21b, and the output phase error voltage $V_2$ of the phase comparator 23 is passed through the switching circuit 21 and is applied to the motor 11 through a phase compensating circuit 31 and a motor driving circuit 32. Thus, the rotational speed of the motor 11 swiftly increases up to a rotational speed which is near the steady state rotational speed, immediately after the motor 11 is started.

In a case where the rotational speed of the motor 11 reaches the rotational speed which is near the steady state rotational speed at the time $t_1$ and the pickup reproducer 14 is in the stand-by state at the time $t_2$ which is the predetermined delay time $T_d$ after the time $t_1$, the output signal e of the steady state rotation discriminating circuit 26 assumes a low level as described before. Hence, in this case, the switching circuit 21 is switched over from the terminal 21b and is connected to the terminal 21a. The output phase error voltage $V_1$ of the filter circuit 20 is supplied to the motor 11, and the rotational speed of the motor 11 is controlled so that the phase of the first reference signal $f_{R1}$ coincides with the phase of the reproduced horizontal synchronizing signal. At the same time $t_2$, the switching circuit 25 is turned OFF. Hence, a terminal voltage $V_{c-c}$ of the capacitor $C_1$ immediately before the switching circuit 25 is switched, is equal to a value $V_{2-s}$ of the phase error voltage $V_2$ at the time $t_2$, as described in the following equation (1).

$$V_{c-c} = V_{2-s} \qquad (1)$$

Due to the switching of the switching circuits 21 and 25, the phase of the reproduced horizontal synchronizing signal is compared with the phase of the first reference signal $f_{R1}$ as described before, and the reproduced horizontal synchronizing signal is locked with the first reference signal $f_{R1}$. A D.C. voltage $V_{1-s}$ of the phase error voltage $V_1$ in this locked-in state, can be described by the following relation (2) in a case where the load and the like of the motor 11 does not change before and after the switching circuits 21 and 25 are switched.

$$V_{1-s} \approx V_{2-s} \qquad (2)$$

A terminal voltage $V_{c-s}$ of the capacitor $C_1$ in this locked-in state is equal to the voltage $V_{1-s}$, and thus, the following relation (3) can be obtained from the relation (2).

$$V_{c-s} \approx V_{2-s} \quad (3)$$

Accordingly, the following relation (4) can be derived from the equation (1) and the relation (3), between the terminal voltage $V_{c-c}$ of the capacitor $C_1$ immediately before the switching circuits 21 and 25 are switched and the terminal voltage $V_{c-s}$ of the capacitor $C_1$ while the motor 11 is rotating at the steady state rotational speed.

$$V_{c-c} \approx V_{c-s} \quad (4)$$

For this reason, according to the present embodiment, the phase error voltage $V_2$ will become locked with the phase error voltage $V_1$ with a satisfactory stability, because the terminal voltage $V_{c-c}$ of the capacitor $C_1$ immediately before the lock-in takes place and the terminal voltage $V_{c-s}$ of the capacitor $C_1$ after the lock-in takes place are approximately equal to each other.

When the pickup reproducer 14 assumes the stand-by state, the switching of the switching circuits 21 and 25 are controlled responsive to the output signal e of the steady state rotation discriminating circuit 26 as described before. However, when the steady state rotation discriminating circuit 26 discriminates that the motor 11 had reached the steady state rotational speed even though the rotational speed of the motor 11 has not actually reached the steady state rotational speed, the relation (4) described before may not stand. But according to the present embodiment, the lock-in takes place by switching the switching circuits 21 and 25 after the predetermined delay time $T_d$ which is greater than or equal to the time it takes for the rotational speed of the motor 11 to reach the steady state rotational speed from the rotational speed which is near the steady state rotational speed. Thus, the relation (4) will always stand according to the present embodiment.

On the other hand, in a case where the motor 11 runs out of a predetermined rotational speed range from the steady state rotational speed and begins to rotate at the non-steady state rotational speed, the steady state rotation discriminating circuit 26 produces a switching signal essentially without a delay, so as to connect the switching circuit 21 to the terminal 21b and turn ON the switching circuit 25. For this reason, when an abnormal disturbance or load is applied to the motor 11, it is possible to immediately detect the abnormal state from the abnormal phase error between the second reference signal $f_{R2}$ and the rotation detection signal from the frequency generator 17 and accordingly protect the system. Therefore, it is possible to design a system which has a high safety factor and in which the rotational speed of the motor 11 will not increase to such an extremely high rotational speed that the rotational speed of the motor is uncontrollable.

Figure 5:
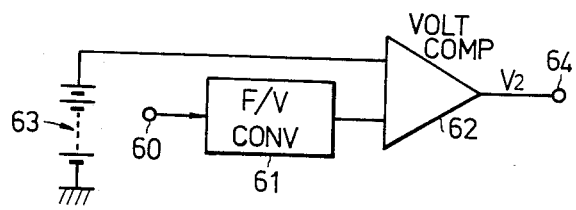
FIG. 5 is a circuit diagram showing another embodiment of a circuit for producing a second error voltage within the circuit system shown in FIG. 1.

Next, description will be given with respect to another embodiment of circuits for producing a second phase error voltage $V_2$ within the circuit system shown in FIG. 1, by referring to FIG. 5. In FIG. 5, the output rotation detection signal of the frequency generator 17 is applied to an input terminal 60, and is supplied to a frequency-to-voltage (F/V) converter 61. The rotation detection signal is subjected to a frequency-to-voltage conversion in the F/V converter 61, and an output voltage of the F/V converter 61 is supplied to a voltage comparator 62. The voltage comparator 62 compares the output voltage of the F/V converter 61 with a reference voltage from a reference voltage source 63. The output reference voltage of the reference voltage source 63 is equal to a voltage which is obtained by subjecting the second reference signal $f_{R2}$ to a frequency-to-voltage conversion. The voltage comparator 62 produces an error voltage which is dependent on the voltage difference between the two compared voltages. The output error voltage of the voltage comparator 62 is essentially the phase error voltage $V_2$ which is dependent on the phase error between the rotation detection signal and the second reference signal $f_{R2}$. The output error voltage $V_2$ of the voltage comparator 62 is produced through an output terminal 64.

The present invention is not limited to the embodiments described heretofore. For example, the rotation control apparatus according to the present invention is not limited to the application to the video disc reproducing apparatus, and may be applied to other reproducing apparatuses such as a video tape recorder (VTR) and a data recorder. When the rotation control apparatus according to the present invention is applied to the VTR, a capstan motor for moving a magnetic tape is controlled by the rotation control apparatus.

In addition, the present invention may also be applied to a constant linear velocity (CLV) system disc reproducing apparatus. In this case, a motor for rotating a disc is controlled by varying the second reference signal according to the position of a reproducing element on the disc. Further, other known means may be used to detect the rotation of the motor.

The steady state rotation discriminating circuit 26 may be designed to discriminate whether the rotational speed of the motor is near the steady state rotational speed, by detecting whether the output error voltage of the circuit shown in FIG. 5 is within a voltage range obtained when the rotational speed of the motor is near the steady state rotational speed.

In addition, the synchronizing signal which is reproduced from the recording medium, may be other synchronizing signals such as a vertical synchronizing signal and a color synchronizing signal (color burst signal). Moreover, the synchronizing signal which is reproduced from the recording medium, may be a signal of synchronizing bits which have a fixed pattern and are added to a digital information data, and may be a clock signal reproduced from a recording medium which is recorded with an information signal which has been subjected to a modulation system such as a bi-phase modulation system. In the present specification, all of these signals are within the scope of the synchronizing signal reproduced from the recording medium. Furthermore, the information signal recorded on the recording medium may be other signals such as audio signals and digital data. In addition, the signal applied to the capacitor $C_1$ may be a signal which has a predetermined level relation with the second phase error voltage $V_2$.

Further, the present invention is not limited to these embodiments, but various variations and modifications may be made without departing from the scope of the present invention.

What is claimed is:

1. A rotation control apparatus for a motor, said rotation control apparatus comprising:
   a motor for rotating or moving a recording medium which is pre-recorded with an information signal and a synchronizing signal;

rotation detecting means for detecting the rotation of said motor and for producing a rotation detection signal having a period which is dependent on the rotational speed of said motor;

a synchronizing signal separating circuit for separating the synchronizing signal from a signal which is reproduced from said recording medium;

reference signal generating circuit for generating first and second reference signals;

first error signal producing means for comparing the phase of the first reference signal generated from said reference signal generating circuit with the phase of the separated synchronizing signal from said synchronizing signal separating circuit so as to obtain a first phase error signal which is dependent on a phase error between the two compared signals, said first error signal producing means comprising a filter circuit having a capacitor, said first phase error signal being passed through said filter circuit and being produced as a first error signal;

second error signal producing means for comparing the phase of the second reference signal generated from said reference signal generating circuit with the phase of the rotation detection signal from said rotation detecting means, and for producing a second error signal which is dependent on a phase error between the two compared signals;

a steady state rotation discriminating circuit at least supplied with the rotation detection signal, for discriminating whether the rotational speed of said motor is near a steady state rotational speed;

a first switching circuit for selectively supplying to said motor one of the first and second error signals from said first and second error signal producing means;

a second switching circuit for selectively supplying to said capacitor of said filter circuit within said first error signal producing means a specific signal having a level which is dependent on the level of the second error signal; and switching control means at least supplied with an output discrimination signal of said steady state rotation discriminating circuit, for controlling the switching of said first and second switching circuits, said switching control means supplying the specific signal to said capacitor through said second switching circuit and selectively passing the second error signal through said first switching circuit when said motor rotates at a rotational speed which is not near the steady state rotational speed, said switching control means blocking the supply of the specific signal to said capacitor by said second switching circuit and selectively passing the first error signal through said first switching circuit when said motor rotates at a rotational speed which is approximately equal to the steady state rotational speed, the level of said first error signal being variably controlled according to the level of the second error signal when said motor rotates at a rotational speed which is not near the steady state rotational speed.

2. A rotation control apparatus as claimed in claim 1 in which said steady state rotation discriminating circuit comprises a detecting circuit at least supplied with the rotation detection signal, for detecting whether the rotational speed of said motor has reached a rotational speed near the steady state rotational speed and for producing a detection signal when it is detected that said motor has reached a rotational speed near the steady state rotational speed, and a time constant circuit responsive to the output detection signal of said detecting circuit, for producing with a predetermined delay time a discrimination signal which indicates that said motor has reached the steady state rotational speed, said predetermined delay time being greater than or equal to a time it takes for said motor to essentially reach the steady state rotational speed from a time when the output detection signal of said detecting circuit is supplied to said time constant circuit.

3. A rotation control apparatus as claimed in claim 2 in which said detecting circuit comprises a pulse generating circuit supplied with the rotation detection signal and the second reference signal, for generating a pulse signal having a pulse width dependent on a phase error between the rotation detection signal and the second reference signal, and a pulse width comparing circuit supplied with the output pulse signal of said pulse generating circuit, for producing a detection signal which indicates that said motor has reached a rotational speed near the steady state rotational speed when the pulse width of the pulse signal is narrower than a predetermined value and indicates that said motor is rotating at a non-steady state rotational speed when the pulse width of the pulse signal is greater than the predetermined value.

4. A rotation control apparatus as claimed in claim 1 in which said steady state rotation discriminating circuit comprises a detecting circuit at least supplied with the rotation detection signal, for detecting whether the rotational speed of said motor has reached a rotational speed near the steady state rotational speed and for producing a detection signal when it is detected that the rotational speed of said motor has changed from the steady state rotational speed to a non-steady state rotational speed which is out of a predetermined rotational speed range, said predetermined rotational speed range having the steady state rotational speed as the center of the range, and a time constant circuit responsive to the output detection signal of said detecting circuit, for producing a discrimination signal which indicates that said motor is rotating at the non-steady state rotational speed with essentially no time delay from a time when the output detection signal of said detecting circuit is supplied to said time constant circuit.

5. A rotation control apparatus as claimed in claim 4 in which said detecting circuit comprises a pulse generating circuit supplied with the rotation detection signal and the second reference signal, for generating a pulse signal having a pulse width dependent on a phase error between the rotation detection signal and the second reference signal, and a pulse width comparing circuit supplied with the output pulse signal of said pulse generating circuit, for producing a detection signal which indicates that said motor has reached a rotational speed near the steady state rotational speed when the pulse width of the pulse signal is narrower than a predetermined value and indicates that said motor is rotating at a non-steady state rotational speed when the pulse width of the pulse signal is greater than the predetermined value.

6. A rotation control apparatus as claimed in claim 1 in which said switching control means comprises a stand-by state detector for detecting whether a pickup reproducer is in a stand-by state for reproducing the pre-recorded signals from the recording medium and for producing a stand-by state detection signal when it is detected that the pickup reproducer is in the stand-by state, and a switching control circuit for selectively producing the output signal of said steady state rotation detecting circuit as a switching signal during a time period in which a stand-by state detection signal is supplied to said switching circuit from said stand-by state detector, and for selectively producing a switching signal which controls said first switching circuit to selectively pass the second error signal and controls said second switching circuit to selectively pass the specific signal during a time period in which no stand-by signal is produced from said stand-by state detector regardless of whether the output signal of said steady state rotation discriminating circuit is supplied to said switching control circuit.

7. A rotation control apparatus as claimed in claim 1 in which said second error signal producing means comprises an input terminal for receiving the rotation detection signal, a frequency-to-voltage converter for subjecting the rotation detection signal which is applied to said input terminal to a frequency-to-voltage conversion, a reference voltage source for producing a reference voltage which is equal to a voltage which is obtained by subjecting the second reference signal to a frequency-to-voltage conversion, and a voltage comparator for comparing an output voltage of said frequency-to-voltage converter and an output reference voltage of said reference voltage source and for producing an error voltage which is dependent on a voltage difference between the two compared voltages as said second error signal.

* * * * *